(12) United States Patent  
Summerson et al.

(10) Patent No.: US 9,113,470 B2  
(45) Date of Patent: *Aug. 18, 2015

(54) SYSTEMS AND METHODS FOR NETWORK CODING USING MAXIMUM DISTANCE SEPARABLE (MDS) LINEAR NETWORK CODES

(75) Inventors: Samantha Rose Summerson, Houston, TX (US); Anuj Batra, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 314 days.

This patent is subject to a terminal disclaimer.

(21) Appl. No.: 13/595,894

(22) Filed: Aug. 27, 2012

(65) Prior Publication Data

US 2013/0229991 A1 Sep. 5, 2013

Related U.S. Application Data

(60) Provisional application No. 61/527,951, filed on Aug. 26, 2011.

(51) Int. Cl.  
*H04W 4/00* (2009.01)  
*H04W 72/04* (2009.01)  
*H04L 1/00* (2006.01)

(52) U.S. Cl.  
CPC .......... *H04W 72/0466* (2013.01); *H04L 1/0076* (2013.01)

(58) Field of Classification Search  
CPC .................................................. H04L 1/0076  
USPC ......... 370/329; 714/776; 375/240.01; 341/50  
See application file for complete search history.

(56) References Cited

U.S. PATENT DOCUMENTS

| 5,278,846 | A | 1/1994 | Okayama et al. |
| 8,185,811 | B2 | 5/2012 | Li et al. |
| 2002/0006138 | A1 | 1/2002 | Odenwalder |
| 2002/0172292 | A1 | 11/2002 | Gray |
| 2003/0093741 | A1 | 5/2003 | Argon et al. |
| 2004/0025102 | A1 | 2/2004 | Yokokawa |
| 2006/0170571 | A1* | 8/2006 | Martinian et al. ............... 341/50 |
| 2009/0080510 | A1* | 3/2009 | Wiegand et al. .......... 375/240.01 |
| 2009/0300469 | A1 | 12/2009 | Rajakarunanayake |
| 2010/0153822 | A1* | 6/2010 | Huang et al. ................... 714/776 |
| 2010/0201398 | A1 | 8/2010 | Zhao et al. |
| 2010/0205510 | A1 | 8/2010 | von der Embse |
| 2012/0151295 | A1 | 6/2012 | Neeman et al. |
| 2012/0236763 | A1 | 9/2012 | Lucani et al. |
| 2013/0297994 | A1 | 11/2013 | Eroz et al. |

* cited by examiner

*Primary Examiner* — Wei Zhao  
*Assistant Examiner* — Lionel Preval  
(74) *Attorney, Agent, or Firm* — Steven A. Shaw; Frank D. Cimino (57) ABSTRACT

A method for network coding includes generating a message matrix, where each column of the message matrix corresponds to one of K message packets and each element in a column of the message matrix corresponds to one of the symbols of the corresponding message packet. The method further includes generating a network code matrix to map the K message packets to N encoded packets, where any combination of K columns of the network code matrix is linearly independent and N is greater than K. The method also includes multiplying the message matrix by the network code matrix to generate a transmission matrix, where each column of the transmission matrix corresponds to an encoded packet for wireless transmission.

15 Claims, 3 Drawing Sheets

$$X = \begin{Bmatrix} p_{1,1} & p_{1,2} & \cdots & p_{1,K} \\ p_{2,1} & p_{2,2} & \cdots & p_{2,K} \\ \vdots & \vdots & \cdots & \vdots \\ p_{L,1} & p_{L,2} & \cdots & p_{L,K} \end{Bmatrix} \quad A = \begin{Bmatrix} a_{1,1} & a_{1,2} & \cdots & a_{1,N} \\ a_{2,1} & a_{2,2} & \cdots & a_{2,N} \\ \vdots & \vdots & \cdots & \vdots \\ a_{K,1} & a_{K,2} & \cdots & a_{K,N} \end{Bmatrix} \quad Y = \begin{Bmatrix} y_{1,1} & y_{1,2} & \cdots & y_{1,N} \\ y_{2,1} & y_{2,2} & \cdots & y_{2,N} \\ \vdots & \vdots & \cdots & \vdots \\ y_{L,1} & y_{L,2} & \cdots & y_{L,N} \end{Bmatrix}$$

FIG. 2a $$R = \begin{Bmatrix} r_{1,1} & r_{1,2} & \cdots & r_{1,M} \\ r_{2,1} & r_{2,2} & \cdots & r_{2,M} \\ \vdots & \vdots & \cdots & \vdots \\ r_{L,1} & r_{L,2} & \cdots & r_{L,M} \end{Bmatrix} \quad A' = \begin{Bmatrix} a'_{1,1} & a'_{1,2} & \cdots & a'_{1,K} \\ a'_{2,1} & a'_{2,2} & \cdots & a'_{2,K} \\ \vdots & \vdots & \cdots & \vdots \\ a'_{K,1} & a'_{K,2} & \cdots & a'_{K,K} \end{Bmatrix} \quad X' = \begin{Bmatrix} p_{1,1} & p_{1,2} & \cdots & p_{1,K} \\ p_{2,1} & p_{2,2} & \cdots & p_{2,K} \\ \vdots & \vdots & \cdots & \vdots \\ p_{L,1} & p_{L,2} & \cdots & p_{L,K} \end{Bmatrix}$$

SYSTEMS AND METHODS FOR NETWORK CODING USING MAXIMUM DISTANCE SEPARABLE (MDS) LINEAR NETWORK CODES

CROSS-REFERENCE TO RELATED APPLICATION

The present application claims priority to U.S. Provisional Patent Application No. 61/527,951, filed on Aug. 26, 2011; which is hereby incorporated herein by reference. Additionally, the present application may be related to U.S. patent application Ser. Nos. 13/595,774, 13/595,862, 13/596,000, and 13/596,005, now U.S. Pat. No. 8,839,085. All related co-pending application were filed on Aug. 27, 2012.

BACKGROUND

In wireless networks, the ability to correctly receive data packets with increased reliability is important. Typically, if a packet is lost in transmission, the intended recipient requests that the sender retransmit the packet. However, certain systems that utilize a wireless network may require a very low packet loss and retransmission rate, for example where the data being transmitted via the wireless network is critical to the safety or performance of the system. In these systems, packet loss leading to requests for retransmission is unacceptable.

Network coding is a technique that can be used to improve the capacity and efficiency of network transmissions. Network coding functions by transmitting an encoded function of the data bits rather than the original data bits; subsequently, the function of the data bits is decoded to obtain the original data bits. Transmitting functions of the data bits in this manner can reduce the average number of transmissions needed for a given amount of information, which reduces the number of retransmissions needed if there are bit errors or erasures.

Applying a network code to the bits of a packet results in a greater number of bits than originally contained in the packet. Although the extra bits that result from the application of the network code enable the recipient to successfully decode and recover the original bits if the packet is received, if a packet is lost during transmission, the packet must be retransmitted.

SUMMARY

The problems noted above are solved in large part by embodiments directed to a method for network coding includes generating a message matrix, where each column of the message matrix corresponds to one of K message packets and each element in a column of the message matrix corresponds to one of the symbols of the corresponding message packet. The method further includes generating a network code matrix to map the K message packets to N encoded packets, where any combination of K columns of the network code matrix is linearly independent and N is greater than K. The method also includes multiplying the message matrix by the network code matrix to generate a transmission matrix, where each column of the transmission matrix corresponds to an encoded packet for wireless transmission.

Other embodiments are directed to a non-transitory computer-readable medium containing instructions that, when executed by a processor, cause the processor to generate a message matrix, where each column of the message matrix corresponds to one of K message packets and each element in a column of the message matrix corresponds to one of the symbols of the corresponding message packet. The instructions, when executed, also cause the processor to generate a network code matrix to map the K message packets to N encoded packets, where any combination of K columns of the network code matrix are linearly independent and N is greater than K. The instructions, when executed, further cause the processor to multiply the message matrix by the network code matrix to generate a transmission matrix, where each column of the transmission matrix corresponds to an encoded packet for wireless transmission.

Yet other embodiments are directed to a wireless communication device including a network encoder and a physical layer. The network encoder is to generate a message matrix, where each column of the message matrix corresponds to one of K message packets and each element in a column of the message matrix corresponds to one of the symbols of the corresponding message packet. The network encoder is also to generate a network code matrix to map the K message packets to N encoded packets, where any combination of K columns of the network code matrix are linearly independent and N is greater than K. The network encoder is further to multiply the message matrix by the network code matrix to generate a transmission matrix, where each column of the transmission matrix corresponds to an encoded packet for wireless transmission. The physical layer is to transmit the encoded packets via a wireless antenna.

BRIEF DESCRIPTION OF THE DRAWINGS

For a detailed description of exemplary embodiments of the invention, reference will now be made to the accompanying drawings in which:

FIGS. 2a and 2b show examples matrices used for network coding in accordance with various embodiments;

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct electrical connection. Thus, if a first device couples to a second device, that connection may be through a direct electrical connection, or through an indirect electrical connection via other devices and connections.

As used herein, the term "symbol" refers to a grouping of bits, which exists in a Galois field (GF) of $GF(2^q)$, where q bits are grouped into a symbol.

As used herein, the term "message packet" refers to packets that contain data to be transmitted one node to another node in a wireless network.

As used herein, the term "encoded packet" refers to packets that result from encoding a group of message packets according to the various embodiments of the present disclosure.

As used herein, the term "coding rate" refers to the ratio of message packets to encoded packets. For example, if five encoded packets are produced by encoding three message packets, the coding rate is 3/5. Similarly, if seven encoded packets are produced by encoding five message packets, the coding rate is 5/7.

As used herein, the term "erasure packet" or "erasure signal" refers to an indication sent to a decoder at a recipient when a packet failure occurs during transmission of one of the encoded packets (e.g., bit errors or cyclic redundancy check (CRC) failures are detected that occurred during transmission of the encoded packet).

As used herein, the term "received packet" refers to packets successfully received by a decoder at a recipient. For example, if five encoded packets are transmitted and one packet failure occurs, the decoder receives four received packets and one erasure packet or signal.

As used herein, the term "recovered packet" or "decoded packet" refers to packets that result from decoding a group of received packets according to the various embodiments of the present disclosure.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As explained above, a packet containing data in the form of bits or symbols is typically encoded by applying network codes to the bits or symbols of the packet to provide redundancy and data recovery ability in the event that certain bits or symbols of the packet are lost during transmission. This may reduce the average number of transmissions needed for a given amount of information, which subsequently reduces the number of retransmissions in the event of an error or packet erasure. However, if an entire packet is lost during transmission, the packet must be retransmitted.

To take advantage of time diversity in the system and increase reliability, a network code is applied across a plurality of message packets to produce a larger number of encoded packets. The network encoder may assume that the message packets are of the same size. The output of the network encoder is encoded packets that are of the same size as the message packets. The resulting encoded packets may then be transmitted using an existing underlying wireless communication protocol without modification.

In accordance with various embodiments, a network code is applied to multiple message packets (e.g., K message packets) to produce a number of encoded packets (e.g., N encoded packets) greater than the number of message packets. The network code is applied in such a way that the length of the encoded packets is the same as the length of the message packets. The network code is designed such that the recipient can decode the K original message packets from the received encoded packets (or "received packets") as long as the number of received packets is greater than some parameter, typically K. By preemptively sending a larger number of packets than what is required, network coding reduces the packet error rate (PER) and correspondingly the retransmission rate and improves the reliability of a wireless network.

In situations where high packet transmission reliability is required, the application of such a network code provides numerous advantages. For example, a PER of the system or wireless channel may be experimentally determined and the network code may be chosen such that the PER is less than the fraction of packets that can be lost in transmission while still maintaining the ability to recover or decode the original message packets. Additionally, by making the network code known to both the transmitter and the receiver rather than random, the network code does not have to be transmitted along with various packets, which reduces the overhead and increases the throughput of the system. Further, the inverse of the network code (i.e., to decode the received packets) does not need to be calculated on-the-fly because the network code is known to the receiver, which reduces software and hardware complexity and computational requirements.

As explained above, the way in which the network code is applied to message packets results in encoded packets that have the same length as the message packets. Network coding in accordance with the various examples of the present disclosure may be leveraged on top of existing wireless communications protocols without the need to redesign other aspects of the system. In certain embodiments, the network code is applied at the network layer, which allows the network code to be applied on top of an existing wireless communication protocol, such as Wi-Fi or Bluetooth, to increase the reliability of the system.

In accordance with various embodiments, a network code matrix is generated that maps K message packets to N encoded packets, where the encoded packets are of the same length as the message packets. The network code matrix should, when applied to message packets, produce encoded packets such that any K linear combinations of encoded packets are linearly independent. As will be explained in further detail below, this is achieved by ensuring that any K linear combinations of columns of the network code matrix are also linearly independent. Additionally, linear independence of any K linear combinations of columns of the network code matrix allows any K columns to be inverted to subsequently decode received packets at the receiver, even in the presence of packet erasures.

Figure 1:
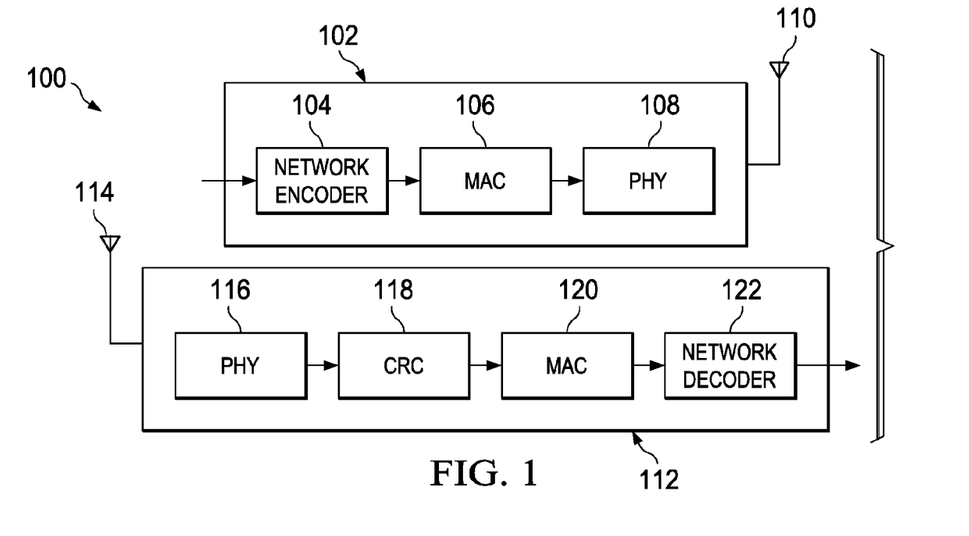
FIG. 1 shows a wireless communications system in accordance with various embodiments.

Turning now to FIG. 1, a wireless communications system 100 is shown in accordance with various embodiments. The system 100 includes a transmitter 102 and a receiver 112. Although the transmitter 102 and receiver 112 are shown separately, this is for simplicity of explanation and one skilled in the art appreciates that the functionality of both the transmitter 102 and the receiver 112 may be embodied in a single wireless transceiver that communicates with other wireless transceivers. The transmitter 102 includes at least a network encoder 106, a medium access control (MAC) layer 106 and a physical layer (PHY) 108. The MAC 106 and the PHY 108 coordinate to enable wireless communications (e.g., transmitting and receiving data packets) via a wireless antenna 110. Similarly, the receiver 112 includes at least a PHY 116, a cyclic redundancy check (CRC) error-detecting block 118, a MAC 120 and a network decoder 122. As above, the MAC 120, the CRC 118 and the PHY 116 coordinate to enable wireless communications via a wireless antenna 114. In some embodiments, the CRC 118 may be replaced or supplemented by a different type of packet error-detecting block.

In accordance with various embodiments, the network encoder 104 receives K message packets containing data to be transmitted from, for example, a higher-layer application executing on the transmitter 102. The network encoder 104 also encodes the message packets to produce N encoded packets, where N is greater than K. As explained above, the length of the message packets is preserved when encoded to produce the encoded packets, and thus the encoded packets are suitable for transmission by the PHY 108 using an underlying wireless communication protocol of the transmitter 102.

In accordance with various embodiments, the network encoder 104 encodes the message packets by first generating a message matrix having each of the K message packets as a column. That is, each element in a column of the message matrix corresponds to one of the symbols of the message packet that forms that column. The network encoder 104 also generates a network code matrix to map the K message packets to N encoded packets. As above, any K linear combinations of columns of the network code matrix are linearly independent. In some embodiments, the network code matrix may be generated at the time of system design; that is, the network code matrix is not generated each time a group of message packets are transmitted. Finally, the network encoder 104 multiplies the message matrix by the network code matrix, which generates a transmission matrix. The transmission matrix contains N columns, corresponding to N encoded packets. Subsequently, the encoded packets may be sent to the PHY 108 (e.g., via the MAC 106) for wireless transmission.

A linear network code can be seen as an application of a linear operator to the original K message packets. In the following discussion, the linear operator is shown as the network code matrix A, which has N columns and K rows. FIG. 2a shows a message matrix X, a network code matrix A, and a transmission matrix Y to illustrate the functionality of the network encoder 104 in further detail. The message matrix X contains K message packets, where each column in X represents a message packet; that is, the elements of a column correspond to symbols or bits of a message packet. As shown, the message matrix X contains L rows, which is the length of the message packets.

The transmission matrix Y is created by multiplying the message matrix X by the network code matrix A. The network code matrix A maps the message matrix X, which is L×K, to the transmission matrix Y, which is L×N. Each of the N columns of the transmission matrix Y corresponds to a transmission packet, also of length L. The network code matrix A must be a full rank matrix in order to ensure that any K linear combinations of encoded packets are linearly independent and therefore can be solved for at the receiver 112. Additionally, the number of linearly independent combinations of packets is dependent on the size of the finite field. For a small size finite field, the number of linearly independent combinations is small. For a large size finite field, the number of linearly independent combinations is large. Thus, depending on system requirements (e.g., PER), a larger finite field may be selected to enable the use of a network code matrix A where N is larger than K+1.

In some cases, it may be desirable to use a known network code matrix A. For example, it may be difficult to generate a random full rank matrix with entries in a Galois (GF) or finite field given by $2^q$ for small values of q. However, minimizing the required GF reduces implementation complexity at both the transmitter 102 and receiver 112. Additionally, a known network code matrix A does not need to be transmitted in every packet and the transmitter 102 and receiver 112 can be optimized for the network code matrix A. The inverse of the network code matrix A may be pre-computed (i.e., for decoding a group of received packets) and its implementation can be optimized at the receiver. In accordance with various embodiments, the network code applied by the network code matrix A is maximum distance separable (MDS), which means that if K or more packets have been received correctly, then the original K message packets can be decoded correctly.

As an example construction of the network code matrix A, assume that N=K+1 and the entries of the network code matrix A belong to $GF(2^q)$. This results in a network coding rate of K/(K+1). Additionally, for any basis of K vectors, a linear network code matrix A is constructed with K columns formed by each basis vector and the remaining column formed by a linear combination of all K columns. This construction ensures that for any K packets received, all original K message packets are recoverable. This is discussed in further detail below.

The K×(K+1) linear network code matrix A, with entries from $GF(2^q)$, is constructed such that any selection of K columns are linearly independent. Since the first K columns, denoted here as A, must be linearly independent, they must form a basis for vectors of length K with entries from $GF(2^q)$. Therefore the $(K+1)^{th}$ column can we written as a linear combination of the set $\{A_i|i=1, \ldots, K\}$. Thus, $A_{K+1}$ may be constructed as $$A_{K+1} = \sum_{i=1}^{K} \alpha_i A_i,$$

where the coefficients are elements of a finite field, $\alpha_j \in GF(2^q)$, and are selected such that $\alpha_j \neq 0$. For this coding rate (i.e., K/K+1), the linear network code matrix A can be constructed to work over the smallest possible finite field, GF(2). However, the linear network code matrix A may be designed for larger fields, although there are no advantages to doing so for this coding rate.

If $\alpha_j=0$ for any j, the set $\{X_i|i=1, \ldots, K+1, i \neq j\}$ does not form a linearly independent set. Therefore, the coefficients are chosen such that $\alpha_j \neq 0$ for all j. This construction works for any q greater than or equal to 1, which means that this MDS linear network code structure remains independently of the order of the field. This is beneficial since lower values for q may result in lower complexity at the transmitter 102 and receiver 112.

In cases where there are multiple users of a wireless communication system, it may be beneficial to use MDS linear network codes over fields with q greater than 1 so that each transmitter 102 may use a different linear network code. However, for point-to-point communication, it is sufficient to construct a matrix with entries in GF(2), which translates to lower complexity during encoding and decoding operations. An example of a MDS linear network code construction is a systematic network code matrix, where the first K columns form the identity matrix and the $(K+1)^{th}$ column is all ones (i.e., the sum of all previous columns). For example, where $I_K$ is the identity matrix with dimension K×K:

$$A = \left( I_K \left| \begin{matrix} 1 \\ \vdots \\ 1 \end{matrix} \right. \right).$$

The above matrix will have the same performance as any other K×(K+1) matrix with the property that the combination of any K columns is linearly independent, since decoding performance depends on the likelihood of receiving a sufficient number of network coded packets in order to recover all original message packets. For example, provided that the PER of the wireless channel is less than 1/(K+1), fewer retransmissions will be needed on average. In fact, one key characteristic of this linear network code is that it is MDS, so there are no gains in the point-to-point case of constructing a linear network code of rate K/(K+1) over a higher order field. In cases where the PER of the wireless channel is greater than 1/(K+1), the linear network code matrix A may be constructed over a higher order field such that N may be greater than K+1 while maintaining the property that the combination of any K columns of the network code matrix A is linearly independent. Additionally, the network code matrix A is not unique and there are many transformations that will result in new and different MDS linear network codes. However, these transformations are ultimately all related to the original MDS linear network code described by A.

Referring again to FIG. 1, the PHY 116 of the receiver 112 receives the transmission packets and passes the transmission packets to the CRC 118 for error checking. Typically, all N transmission packets are received; however, in some cases, certain packets may never be received. As will be explained in further detail below, a sequence number or index may be applied to each received packet (e.g., by being transmitted with the packet) that identifies the column of the transmission matrix Y that the received packet corresponds to.

Some transmission packets may not pass the CRC 118, meaning that those packets contain one or more errors and are considered packet erasures. In some embodiments, the CRC 118 may generate an erasure packet or erasure signal to be sent to the network decoder 122 (e.g., via the MAC 120) to inform the network decoder 122 of the transmission packets that were not received successfully. The transmission packets that do pass the CRC 118 (i.e., contain no errors) are referred to as received packets and are sent to the network decoder 122. As explained above, the network code applied to generate the transmission packets is MDS. As a result, provided that at least K transmission packets pass the CRC 118 as received packets, the network decoder 122 is able to decode or recover the original K message packets.

FIG. 2b shows a matrix R that includes M received packets, a decoding matrix A' and a recovered matrix X' to illustrate the functionality of the network decoder 122 in further detail. Although the matrix R is shown as having M columns each corresponding to a received packet, in accordance with various embodiments a received packet matrix (not shown) is generated that contains a number of received packets equal to the number of original message packets, namely K. The selection of received packets may take many forms, provided that K received packets are selected to make up the columns of the received packet matrix. As explained above, the network decoder 122 is able to decode or recover the original K message packets provided that at least K transmission packets pass the CRC 118 as received packets. Additionally, as will be explained in further detail below, the decoding matrix A' is a K×K matrix, and thus the received packet matrix also contains K columns so that it may be multiplied by the decoding matrix A'.

The decoding matrix A' is formed by first selecting columns from the network coding matrix A that have indices that are the same as the indices of the encoded packets that correspond to the selected received packets. In some embodiments, a sequence number or index may be applied to each received packet (e.g., by being transmitted with the packet) that identifies the column of the transmission matrix Y that the received packet corresponds to. For example, assume the network code applies a coding rate of 5/6. Thus there are 6 encoded packets in the transmission matrix Y. Of the 6 encoded packets, the encoded packet in column 5 of the transmission matrix Y does not pass the CRC 118. Thus there are 5 received packets that correspond to encoded packets in the transmission matrix having indices 1, 2, 3, 4 and 6. Then, assume that the received packet selection scheme is to select the first K (i.e., also 5 in this case) received packets to generate the received packet matrix. Thus, the selected received packets correspond to encoded packets in the transmission matrix having indices 1, 2, 3, 4 and 6 and make up the columns of the received packet matrix.

As a result, columns 1, 2, 3, 4 and 6 of the network coding matrix A are selected, since these columns have the same indices as the encoded packets that correspond to the selected received packets in the received packet matrix. Then, the selected columns of the network coding matrix A, which result in a K×K matrix, are inverted to form the decoding matrix A'. Further, the arrangement of the selected columns of the network coding matrix A in the decoding matrix A' should match the arrangement of the selected received packets in the received packet matrix. For example, if the ordering of the selected received packets is, for some reason, altered to correspond to columns 3, 4, 6, 1 and 2 of the transmission matrix, then the selected columns of the network coding matrix A should also be ordered as columns 3, 4, 6, 1 and 2 prior to inversion. One skilled in the art will appreciate that inversion of the sub-matrix of the network coding matrix A is possible because a property of any K columns of the network coding matrix A is that their combination is linearly independent.

Subsequently, the received packet matrix is multiplied by the decoding matrix A' to generate a recovered matrix X'. Each column of the recovered matrix X' corresponds to one of the original K message packets, and thus the original K message packets are decoded successfully at the receiver 112 despite an encoded packet being lost during transmission from the transmitter 102 to the receiver 112. Additionally, although the above example only suggested one packet was lost during transmission, where the network code is designed such that N is greater than K+1, up to N−K packets may be lost during transmission and the original K message packets are still recoverable by the network decoder 112.

Alternately, in some embodiments all M received packets may be selected, provided that M is greater than K. In this case, A' may be generated by taking the pseudo-inverse of the corresponding M columns of the network code matrix A. Thus, the received packet matrix comprises the matrix R, which is L x M; the decoding matrix A' is M×K; and the decoded matrix X' is L×K. As above, each column of the decoded matrix X' corresponds to one of the original K message packets.

In accordance with various embodiments, by preemptively sending a larger number of packets (i.e., N packets) than what is required for successful decoding (i.e., K packets), the PER is reduced and thus retransmission of packets is correspondingly reduced. This provides increased reliability for wireless communications in the system 100. Additionally, as explained above, the network coding scheme may be employed at the network layer so that underlying wireless communications protocols may be maintained without costly modification. However, in alternate embodiments, the network coding scheme may be employed at the MAC 106, 120 with minimal modifications while still taking advantage of already-developed commercial devices that utilize certain wireless communication protocols.

The above-described wireless communication system 100 may be employed to provide a point-to-point link, however is not limited to such links. One example of applications in which increased reliability is important is point-to-point video links, such as those used in vehicular backup cameras where a wired connection is cumbersome or unwarranted. In these cases, it is highly important that the video stream be received reliably without any dropout (i.e., low packet loss and a small number of packet retransmissions). Another example of applications in which increased reliability is important is wireless sensors on a vehicle, such as sensors used to monitor tire pressure, engine temperatures, and other critical system parameters. Another application is wireless video distribution from a set-top box or phone to a TV or monitor. In all of these applications, it is extremely important that the information (e.g., video packets) be delivered reliably and without the need for retransmission.

In some embodiments, if the message packets are not the same length, then pad bits or symbols may be inserted to the message packets to ensure that all of the message packets are of equal length before the encoding process. In some cases, the pad bits or symbols are not required to be transmitted wirelessly as long as the packet lengths are known or conveyed to the receiver 112. Then, at the receiver 112, these pad bits or symbols may be re-inserted before the received packets are passed to the network decoder 122.

Figure 3:
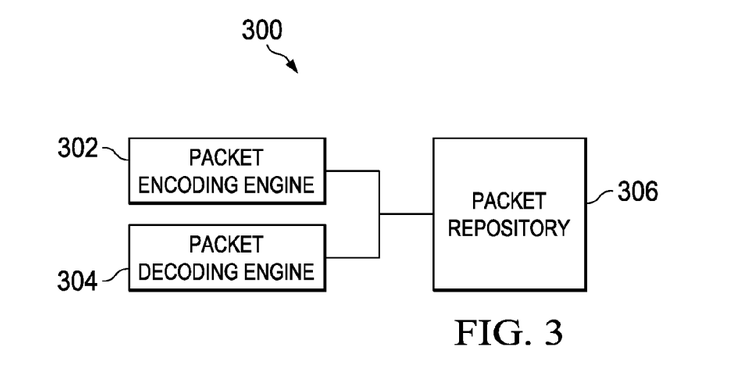
FIG. 3 shows a network coding system in accordance with various embodiments.

FIG. 3 shows a network coding system 300 in accordance with various embodiments. The network coding system 300 includes a packet encoding engine 302 and a packet decoding engine 304. In addition, a packet repository 306 may be coupled to the engines 302, 304. The packet encoding engine 302 and the packet decoding engine 304 are combinations of programming and hardware to execute the programming. Although shown separately, the packet encoding engine 302 and the packet decoding engine 304 are not required to represent separate pieces of software programming. For example, each engine 302, 304 may share a common processor and memory, although this is not required. Additionally, the programming that enables the functionality of each engine 302, 304 may be included in the same executable file or library.

The packet encoding engine 302 receives message packets that contain data to be transmitted from, for example, a higher-layer application executing on the transmitter 102. The message packets may be received from the packet repository 306. The packet encoding engine 302 also encodes the message packets to produce a number of encoded packets greater than the number of message packets. As explained above, the length of the message packets is preserved when encoded to produce the encoded packets, and thus the encoded packets are suitable for subsequent transmission (e.g., by the PHY 108) using an underlying wireless communication protocol of a transmitter. In accordance with various embodiments, the packet encoding engine 302 encodes the message packets by application of a linear operator to the original K message packets. For example, as explained above, a message matrix X is generated from the K message packets and the linear operator is shown as the network code matrix A, which has N columns and K rows. The packet encoding engine 302 encodes the message matrix X by multiplying it by the network code matrix A to produce a transmission matrix Y, which has N columns that each correspond to a transmission packet. Thus, the packet encoding engine 302 performs the encoding process as is described above with respect to FIGS. 1 and 2a.

The packet decoding engine 304 receives a number of received packets that pass the CRC 118. The packet decoding engine 304 may also receive an erasure packet or erasure signal (e.g., from the CRC 118) that indicates one or more transmitted encoded packets were not received successfully. The received packets and/or the erasure packets may be at least temporarily stored at the packet repository 306. Similar to above, the packet decoding engine 304 selects a number of received packets equal to the number of original message packets (i.e., K received packets) to form columns of a received packet matrix. The packet decoding engine 304 generates a decoding matrix by forming a sub-matrix by selecting columns of a network coding matrix (e.g., a matrix used by the packet encoding engine 302 to encode message packets prior to their transmission) that have indices that are the same as the indices of the encoded packets that correspond to the selected received packets. Then, the packet decoding engine 304 inverts the sub-matrix to form the decoding matrix. Finally, the packet decoding engine 304 multiplies the received packet matrix by the decoding matrix to generate a recovery matrix where each column corresponds to a decoded packet. This is similar to the decoding process as described above with respect to FIGS. 1 and 2b.

Figure 4:
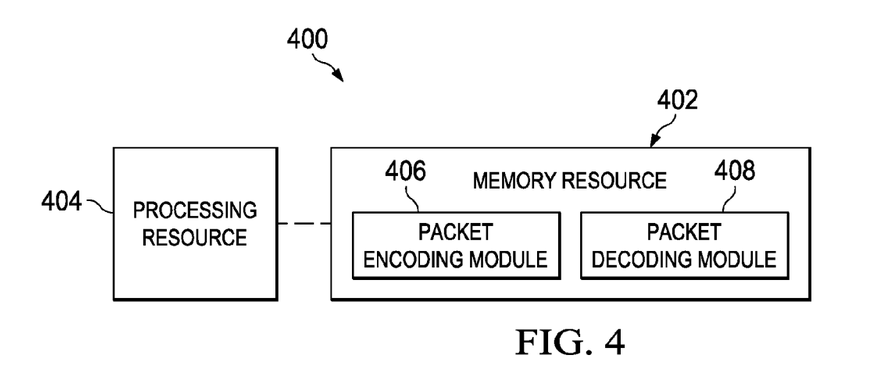
FIG. 4 shows an alternate network coding system in accordance with various embodiments.

FIG. 4 shows another example of a network coding system 400 in accordance with various embodiments. The network coding system 400 includes a memory resource 402 coupled to a processing resource 404. The processing resource 404 is one or more local or distributed processors. The memory resource 402 includes one or more local or distributed memory devices and comprises a packet encoding module 406 and a packet decoding module 408. Thus, the memory resource 402 and the processing resource 404 are hardware components of the system 400.

Each module 406, 408 represents instructions that, when executed by the processing resource 404, implement an associated engine. For example, when the packet encoding module 406 is executed by the processing resource 404, the above-described packet encoding engine 302 functionality is implemented. Similarly, when the packet decoding module 408 is executed by the processing resource 404, the above-described packet decoding engine 304 functionality is implemented. The modules 406, 408 may also be implemented as an installation package or packages stored on the memory resource 402, which may be a CD/DVD or a server from which the installation package may be downloaded. Additionally, in some embodiments, the above-described functionality may be implemented in an application-specific integrated circuit (ASIC), a combination of an ASIC and software, or an application-specific instruction-set processor (ASIP).

Figure 5:
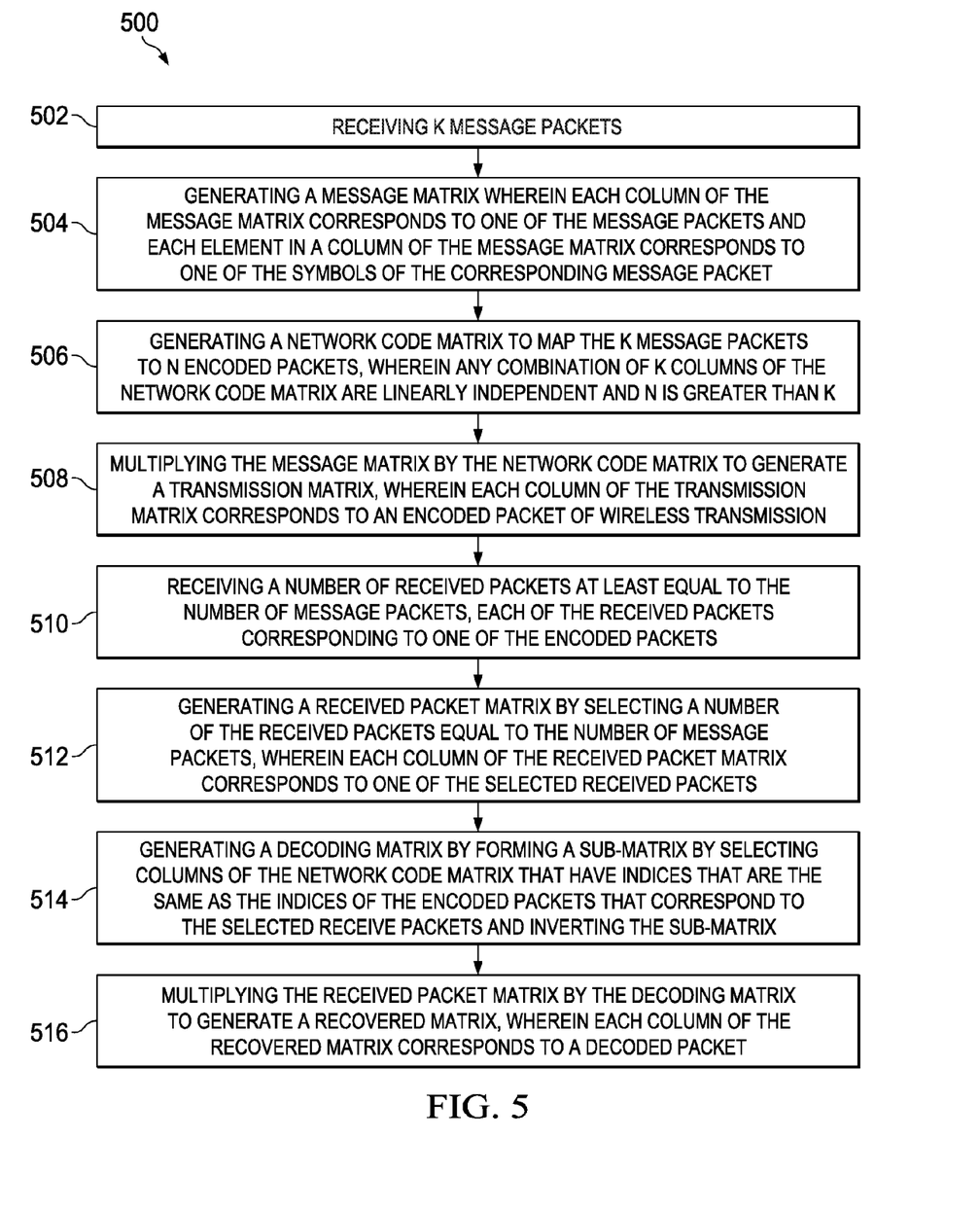
FIG. 5 shows a flow chart of a method in accordance with various embodiments.

FIG. 5 shows a method 500 for network coding in accordance with various embodiments. The method 500 may be performed by, for example, a hardware processor of the transmitter 102 or the receiver 112. The method 500 begins in block 502 with receiving K message packets. The message packets may be received from, for example, a higher-layer application executing on the transmitter 102. The method 500 continues in block 504 with generating a message matrix. Each column of the message matrix corresponds to one of the message packets and each element in a column of the message matrix corresponds to one of the symbols of the corresponding message packet. The method 500 then continues in block 506 with generating a network code matrix to map the K message packets to N encoded packets. Any combination of K columns of the network code matrix is linearly independent and N is greater than K. The method 500 further continues in block 508 with multiplying the message matrix by the network code matrix to generate a transmission matrix. Each column of the transmission matrix corresponds to an encoded packet for wireless transmission. As explained above, the length of the message packets is preserved when encoded to produce the encoded packets, and thus the encoded packets are suitable for transmission by the PHY 108 using an underlying wireless communication protocol of the transmitter 102. Subsequently, the encoded packets may be sent to the PHY 108 (e.g., via the MAC 106) for wireless transmission.

In some embodiments the method 500 may also include, as in block 510, receiving a number of received packets at least equal to the number of message packets. The received packets each correspond to one of the encoded packets. The method 500 may further continue in block 512 with generating a received packet matrix by selecting a number of the received packets equal to the number of message packets (i.e., K received packets) and using the selected received packets as columns of the received packet matrix.

The method 500 may then continue in block 514 with generating a decoding matrix by forming a sub-matrix by selecting columns of the network code matrix that have indices that are the same as the indices of the encoded packets that correspond to the selected received packets and inverting the sub-matrix. This is similar to the decoding matrix generation described above with respect to FIGS. 1 and 2b. Finally, the method 500 may continue in block 516 with multiplying the received packet matrix by the decoding matrix to generate a recovered matrix, where each column of the recovered matrix corresponds to a decoded packet.

The above discussion is meant to be illustrative of the principles and various embodiments of the present invention. Numerous variations and modifications will become apparent to those skilled in the art once the above disclosure is fully appreciated. For example, although described generally as a linear network code, the network code may include systematic and non-systematic BCH codes or systematic or non-systematic linear block codes. Additionally, although described as a matrix-based implementation, this is done for ease of explanation; the above MDS linear network coding scheme may be implemented in other ways, such as the use of linear feedback shift registers, or other methods. Further, although described generally with respect to wireless communications, the above MDS linear network coding scheme may be utilized in other communication systems, such as wired systems or powerline communication (PLC) systems. It is intended that the following claims be interpreted to embrace all such variations and modifications.

What is claimed is:

1. A method for network coding, comprising:
generating, by a processor, a message matrix wherein each column of the message matrix corresponds to one of K message packets and each element in a column of the message matrix corresponds to one of the symbols of the corresponding message packet;
generating, by the processor, a network code matrix to map the K message packets to N encoded packets, wherein any combination of K columns of the network code matrix is linearly independent and N is greater than K; and
multiplying, by the processor, the message matrix by the network code matrix to generate a transmission matrix, wherein each column of the transmission matrix corresponds to an encoded packet for wireless transmission;
sending by the processor the resulting encoded packets to a physical layer of a wireless transmitter for transmission using an existing underlying wireless communication protocol without modification.

2. The method of claim 1 wherein the method is performed at a network layer of a wireless transmitter.

3. The method of claim 1 further comprising adding pad symbols to one or more of the message packets such that a resulting length of each message packet is the same.

4. The method of claim 1 wherein the number of message packets and encoded packets are given by a coding rate of a linear network code specified by the network code matrix.

5. The method of claim 4 wherein the linear network code is maximum distance separable.

6. The method of claim 1 further comprising:
receiving, by the processor, a number of received packets at least equal to the number of message packets, each of the received packets comprising a sequence index that correlates the received packet to one of the encoded packets;
generating, by the processor, a received packet matrix by selecting a number of the received packets equal to the number of message packets, wherein each column of the received packet matrix corresponds to one of the selected received packets;
generating, by the processor, a decoding matrix by forming a sub-matrix by selecting columns of the network code matrix that have indices that are the same as the sequence indices of the selected received packets and inverting the sub-matrix; and
multiplying, by the processor, the received packet matrix by the decoding matrix to generate a recovered matrix, wherein each column of the recovered matrix corresponds to a decoded packet.

7. A non-transitory computer-readable medium containing instructions that, when executed by a processor, cause the processor to:
generate a message matrix wherein each column of the message matrix corresponds to one of K message packets and each element in a column of the message matrix corresponds to one of the symbols of the corresponding message packet;
generate a network code matrix to map the K message packets to N encoded packets, wherein any combination of K columns of the network code matrix are linearly independent and N is greater than K; and
multiply the message matrix by the network code matrix to generate a transmission matrix, wherein each column of the transmission matrix corresponds to an encoded packet for wireless transmission;
sending by the processor the resulting encoded packets to a physical layer of a wireless transmitter for transmission using an existing underlying wireless communication protocol without modification.

8. The non-transitory computer-readable medium of claim 7 wherein executing the instructions further causes the processor to add pad symbols to one or more of the message packets such that a resulting length of each message packet is the same.

9. The non-transitory computer-readable medium of claim 7 wherein the number of message packets and encoded packets are given by a coding rate of a linear network code specified by the network code matrix, wherein the linear code is maximum distance separable.

10. The non-transitory computer-readable medium of claim 7 wherein executing the instructions further causes the processor to:
receive a number of received packets at least equal to the number of message packets, each of the received packets comprising a sequence index that correlates the received packet to one of the;
generate a received packet matrix by selecting a number of the received packets equal to the number of message packets, wherein each column of the received packet matrix corresponds to one of the selected received packets;

generate a decoding matrix by forming a sub-matrix by selecting columns of the network code matrix that have indices that are the same as the sequence indices of the selected received packets and inverting the sub-matrix; and multiply the received packet matrix by the decoding matrix to generate a recovered matrix, wherein each column of the recovered matrix corresponds to a decoded packet.

11. A wireless communication device, comprising:

a network encoder to:

generate a message matrix wherein each column of the message matrix corresponds to one of K message packets and each element in a column of the message matrix corresponds to one of the symbols of the corresponding message packet;

generate a network code matrix to map the K message packets to N encoded packets, wherein any combination of K columns of the network code matrix are linearly independent and N is greater than K; and multiply the message matrix by the network code matrix to generate a transmission matrix, wherein each column of the transmission matrix corresponds to an encoded packet for wireless transmission; and a physical layer to transmit the encoded packets via a wireless antenna;

sending by the network encoder the resulting encoded packets to the physical layer of the wireless communication device for transmission using an existing underlying wireless communication protocol without modification.

12. The wireless communication device of claim 11 wherein the network encoder comprises a network layer of a wireless transmitter.

13. The wireless communication device of claim 11 wherein the network encoder adds pad symbols to one or more of the message packets such that a length of each message packet is the same.

14. The wireless communication device of claim 11 wherein the number of message packets and encoded packets are given by a coding rate of a linear network code specified by the network code matrix.

15. The wireless communication device of claim 11 wherein the linear network code is maximum distance separable.

* * * * *